US008442092B2

(12) United States Patent
San Filippo, III et al.

(10) Patent No.: US 8,442,092 B2
(45) Date of Patent: May 14, 2013

(54) CREATION AND USE OF UNIQUE HOPPING SEQUENCES IN A FREQUENCY-HOPPING SPREAD SPECTRUM (FHSS) WIRELESS COMMUNICATIONS NETWORK

(75) Inventors: William San Filippo, III, Redwood Shores, CA (US); Sterling Hughes, San Mateo, CA (US); Jana van Greunen, San Mateo, CA (US); Raj Vaswani, Portola Valley, CA (US)

(73) Assignee: Silver Spring Networks, Inc., Redwood City, CA (US)

( * ) Notice: Subject to any disclaimer, the term of this patent is extended or adjusted under 35 U.S.C. 154(b) by 1448 days.

(21) Appl. No.: 12/005,268

(22) Filed: Dec. 27, 2007

(65) Prior Publication Data
US 2009/0168846 A1 Jul. 2, 2009

(51) Int. Cl.
H04B 1/00 (2006.01)
(52) U.S. Cl.
USPC .......................................... 375/132; 375/133
(58) Field of Classification Search .................. 375/132, 375/133; 370/338
See application file for complete search history.

(56) References Cited

U.S. PATENT DOCUMENTS

| 5,130,987 A * | 7/1992 | Flammer | 370/436 |
| 6,223,048 B1 * | 4/2001 | Noll Barreto et al. | 455/517 |
| 7,054,346 B2 * | 5/2006 | Balachandran et al. | 375/130 |
| 7,280,580 B1 * | 10/2007 | Haartsen | 375/138 |
| 2002/0136268 A1 * | 9/2002 | Gan et al. | 375/133 |
| 2002/0186749 A1 | 12/2002 | Jones | |
| 2004/0057499 A1 * | 3/2004 | Haartsen | 375/136 |
| 2007/0206660 A1 | 9/2007 | Lifchuk | |
| 2008/0310377 A1 * | 12/2008 | Flammer et al. | 370/338 |
| 2011/0206087 A1 * | 8/2011 | Picard | 375/132 |

FOREIGN PATENT DOCUMENTS

| WO | 9600467 | 1/1996 |
| WO | 9919993 | 4/1999 |

OTHER PUBLICATIONS

"Master Table of Contents & Compliance Requirements", Specification of the Bluetooth System—Covered Core Package version: 2.1 + EDR, vol. 2, Jul. 26, 2007 pp. 31, 65-89.
Search Report and Written Opinion dated Mar. 23, 2009.
Patent Examination Report No. 1 dated Oct. 30, 2012 in corresponding AU Application No. 2008343942, 3 pps.

* cited by examiner

Primary Examiner — Shuwang Liu
Assistant Examiner — Helene Tayong
(74) Attorney, Agent, or Firm — Buchanan Ingersoll & Rooney PC

(57) ABSTRACT

A method for generating and using frequency-hopping sequences in frequency-hopping spread spectrum (FHSS) networks, such that no additional network overhead is required to convey a device's hopping sequence to another device, is disclosed. Furthermore, a method to maximize the number of unique hopping sequences, without increasing the random access memory (RAM) requirements on the network devices, is disclosed.

35 Claims, 7 Drawing Sheets

|  |  |  |  |  |  |  |  |  |  |  |  |  |  |  |  |
|---|---|---|---|---|---|---|---|---|---|---|---|---|---|---|---|
| 0: | 25, | 48, | 63, | 7, | 67, | 20, | 75, | 36, | 14, | 57, | 15, | 82, | 17, | 37, | 5, | 26, |
| 16: | 38, | 80, | 81, | 44, | 45, | 28, | 50, | 31, | 64, | 60, | 13, | 2, | 79, | 12, | 16, | 52, |
| 32: | 22, | 21, | 46, | 40, | 30, | 72, | 27, | 74, | 42, | 76, | 19, | 43, | 53, | 24, | 1, | 10, |
| 48: | 33, | 56, | 11, | 41, | 77, | 54, | 78, | 47, | 71, | 3, | 34, | 68, | 69, | 58, | 66, | 39, |
| 64: | 55, | 62, | 4, | 35, | 51, | 59, | 29, | 8, | 9, | 18, | 6, | 70, | 65, | 23, | 73, | 32, |
| 80: | 0, | 61, | 49 | | | | | | | | | | | | | |

FIG. 5

CREATION AND USE OF UNIQUE HOPPING SEQUENCES IN A FREQUENCY-HOPPING SPREAD SPECTRUM (FHSS) WIRELESS COMMUNICATIONS NETWORK

FIELD OF THE INVENTION

The present invention relates to the creation of hopping sequences in frequency-hopping spread spectrum (FHSS) wireless communications networks.

BACKGROUND OF THE INVENTION

Communications devices which operate under Part 15 of the FCC rules for operation in the 902-928 MHz unlicensed spectrum are required to conform to certain technical rules based on the physical layer protocol being used. For frequency-hopping spread spectrum (FHSS) systems, devices must use hopping sequences which have a certain minimum number of channels, and use all channels in the hopping sequence equally. In FHSS-based wireless networks operating in the 902-928 MHz band, such as those utilized in utility automatic meter reading (AMR)/automatic meter infrastructure (AMI) networks, the plurality of nodes located at utility meter and sensor sites have a need to exchange information regarding one another's hopping sequences, packet routing options, statistics of packet routing success, and other network parameters. Given that the environment of utility AMR/AMI networks consists of a large population of low-power devices, the need for network efficiency and memory management is very high.

In FHSS communications systems, a transmitting device needs to know where an intended receiving device is in its hopping sequence in order to transmit data to the receiving device at a given time. One approach for informing the transmitting device of the receiving device's hopping sequence is to store, at each device in a communications network, the hopping sequence tables for all neighboring, or directly connected, devices ahead of time. This approach, however, requires memory be allocated at each device to store the hopping sequence tables of the neighboring devices, which can be significant, depending on the number of neighboring devices. In order to offset the increased memory requirement, this approach might necessitate constraining the overall number of hopping sequences used in the network, which can be disadvantageous (e.g., by making interference between nodes more likely). In another approach, the transmitting device sends a request to the receiving device for the receiving device's hopping sequence table prior to transmitting the data. This approach, however, requires additional network overhead to convey the hopping sequence table between the transmitting and receiving devices prior to the data transfer and also requires the transmitting device to allocate memory to store the receiving node's hopping table.

SUMMARY OF THE INVENTION

In one embodiment, a method is provided to construct and use frequency hopping sequences in frequency-hopping spread spectrum (FHSS) networks such that no additional network overhead is required to convey a device's hopping sequence to another device. Furthermore, in an embodiment, a method is provided to maximize the number of unique hopping sequences without increasing random access memory (RAM) requirements on the network devices.

BRIEF DESCRIPTION OF THE DRAWINGS

The foregoing aspects and many of the attendant advantages of this invention will become more readily appreciated and becomes better understood by reference to the following detailed description, when taken in conjunction with the accompanying drawings, in which:

FIG. 5 illustrates an exemplary global FHSS channel array;

DETAILED DESCRIPTION OF THE INVENTION

Overview

Frequency-hopping spread spectrum (FHSS) is a technique by which a data signal is modulated with a narrowband carrier signal that "hops" in a random, but predictable, sequence from frequency to frequency as a function of time over a wide band of frequencies. The signal energy is spread in the time domain rather than chopping each bit into small pieces in the frequency domain. This technique reduces interference because a signal from a narrowband system will only affect the spread spectrum signal if two transmitters are transmitting at the same frequency at the same time. By suitable synchronization, a single logical channel can be maintained.

FHSS transmission frequencies may be determined by a spreading, or hopping, code. A receiver set to the same hopping code as a transmitter may listen to the incoming signal at the right time and correct frequency in order to properly receive the signal. Current FCC regulations require manufacturers to use about seventy-five or more frequencies per transmission channel with a maximum dwell time (e.g., the time spent at a particular frequency during any single hop) of 400 ms.

Figure 1:
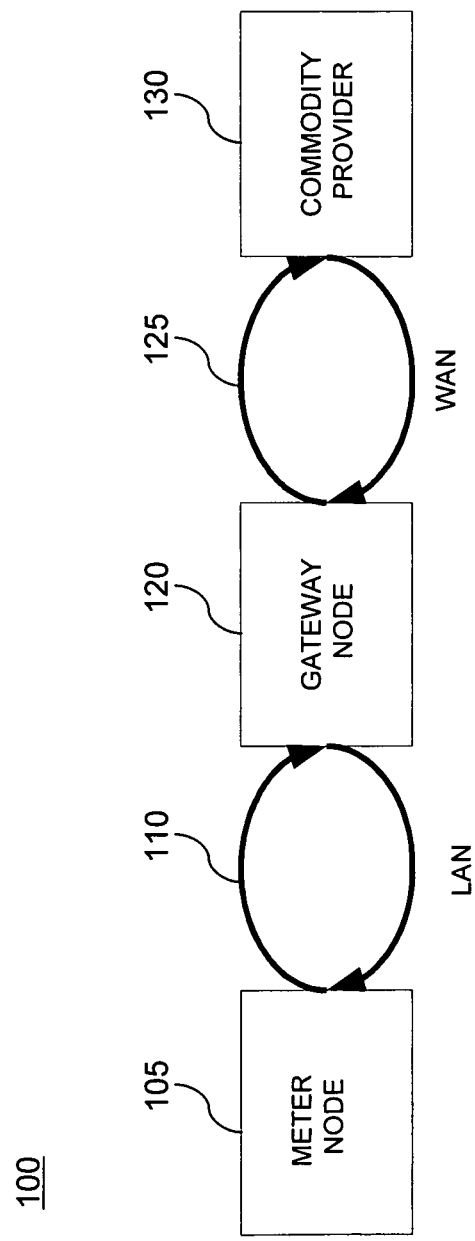
FIG. 1 illustrates an electric meter interfacing with a remote gateway node and a utility service provider, creating an exemplary networked automatic meter reading data communication system.

FIG. 1 illustrates an exemplary utility automatic meter reading (AMR)/automatic meter infrastructure (AMI) network 100 in which the FHSS techniques described herein may be implemented. Network 100 may include a plurality of meter nodes 105 (e.g., an electric utility meter at a home) configured to communicate with a gateway node 120 over a local area network (LAN) 110, and vice versa. The gateway node 120, in turn, is configured to communicate with a commodity provider 130 (e.g., a utility provider) over a wide area network (WAN) 125, and vice versa. For example, during a discovery period in the network 100, the plurality of meter nodes 105 may exchange address information with neighbor nodes, and the gateway node 120 may broadcast global FHSS parameter information to the plurality of meter nodes 105. Following discovery, the meter nodes 105 may communicate in accordance with their associated hopping sequences.

Embodiments of FHSS systems and methods are described herein that may involve a media access control and data link layer (MAC/DLL) designed to work with a frequency-hopping spread spectrum physical layer (FHSS PHY) in the environment of a FHSS-based utility AMR/AMI wireless network. In one embodiment, the FHSS PHY may change channels (or hop) at a relatively fast rate. Persons skilled in the art will understand, however, that the FHSS PHY may hop at a slower rate, although interference between multiple nodes trying to transmit to the same receiving node may be more likely at the slower rate. A node visits, or dwells on, each channel in the node's hopping sequence for an amount of time referred to herein as the "slot time." In an embodiment, if no reception is heard during the slot time, the node changes channels to the next channel in its hopping sequence. If a reception is heard during the slot time, the receiving node stops channel hopping to process the reception. Likewise, when a frame is to be transmitted, the transmitting node stops channel hopping to send the frame on the specified channel, if being broadcast to multiple destinations, or targeted to a node, if being sent to a unicast destination. In both cases, after the transmit/receive transaction ends, the transmit/receive node may resume channel hopping from where the node would have been in its hopping sequence had it not stopped channel hopping to conduct the transmit/receive transaction.

Figure 2:
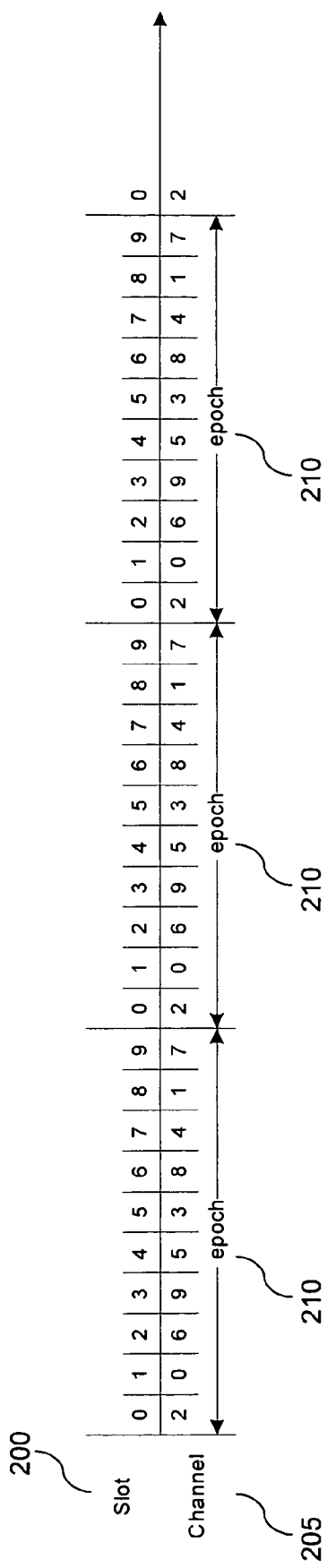
FIG. 2 illustrates an exemplary frequency-hopping spread spectrum (FHSS) hopping sequence.

The traversal of all the channels in a node's hopping sequence is referred to herein as an "epoch." Part 15 of the FCC rules specify that a node's hopping sequence must visit all of the channels in its hopping sequence before revisiting any given channel. In one embodiment disclosed herein, a frequency hopper may be used to guarantee that a node visits all of the channels in its hopping sequence before revisiting a channel by using a pseudo-random hopping sequence, which repeats each epoch. In other words, the channel during a given slot x is always the same. For example, FIG. 2 illustrates an exemplary FHSS hopping sequence for a node that has ten slots 200 and corresponding channels 205. As shown in FIG. 2, during slot 0 of each epoch 210, the corresponding channel is always channel 2, and channel 2 is not visited more than once within a given epoch 210. Persons skilled in the art will understand that other slot/channel parings are possible and need not be limited to those shown in FIG. 2.

Hopping Sequence Determination

In embodiments of the FHSS PHY described herein, devices (or "nodes") traverse channels in a pseudo-random manner called a "hopping sequence." In one embodiment, a particular device's hopping sequence may be calculated given the device's MAC address and, once the hopping sequence of the device is known, a "slot-to-channel" conversion may be made to determine a corresponding channel for a given slot in the hopping sequence. For example, if a node targets another node for a transmission, the transmitting node also needs to know the target node's MAC address, as opposed to the target node's entire hopping sequence, in order to determine on which channel to transmit the packet. MAC address information for the nodes in an AMR/AMI network may be determined, for example, during a discovery period of the network when neighbor nodes exchange address information or when a gateway node in the network transmits such address information to all of the network nodes.

Figure 3:
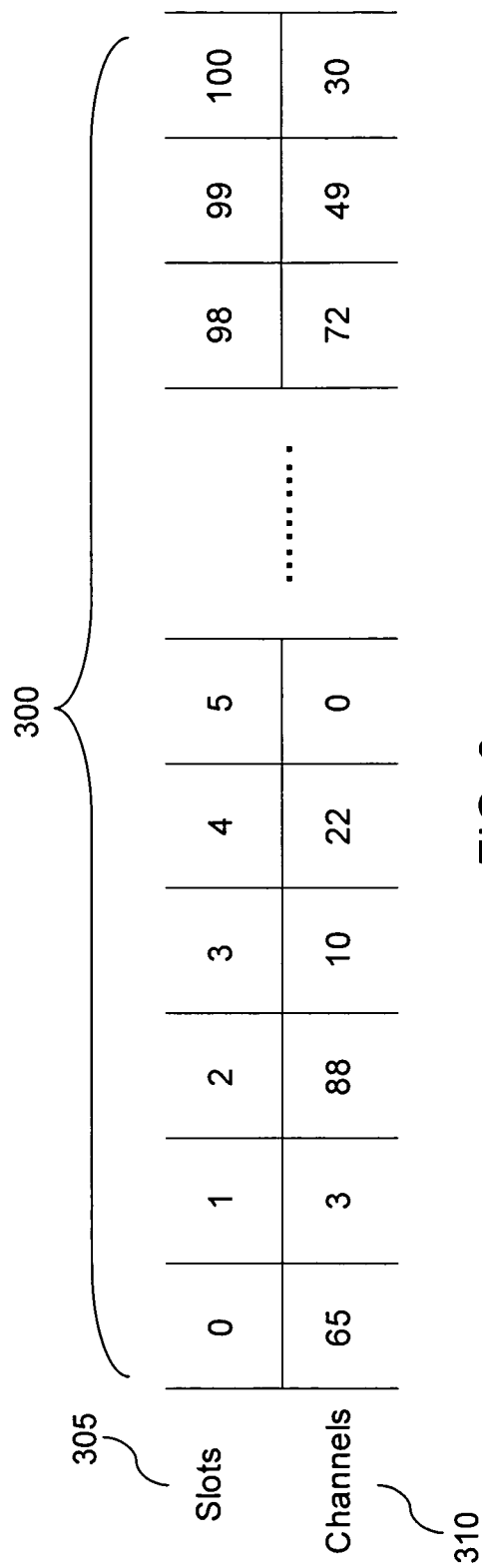
FIG. 3 illustrates another exemplary FHSS hopping sequence.

A slot-to-channel conversion may then be performed based on hopping sequence timing information. The term "slot" is used herein to refer to the amount of time a device dwells on a channel before moving to the next channel in its hopping sequence. Slots are typically traversed in order, starting from 0, and each slot has a corresponding frequency channel. As described herein, in accordance with FCC rules, a device must traverse all of the channels before re-visiting a given channel. Recall that the traversal of all slots in the hopping sequence is called an "epoch." Thus, in an embodiment, an epoch length for a given hopping sequence equals the slot time multiplied by the number of slots (channels) in the hopping sequence. After completing an epoch, the device repeats the hopping sequence. FIG. 3 illustrates another exemplary FHSS hopping sequence, showing the slot-to-channel conversion for that hopping sequence. An epoch 300 of the hopping sequence illustrated in FIG. 3 contains 101 slots 305 and corresponding frequency channels 310 for each of the slots 305. For example, slot 0 has a corresponding channel 65, slot 1 has a corresponding channel 3, slot 2 has a corresponding channel 88, and so forth. Persons skilled in the art will understand that other slot/channel parings are possible and need not be limited to those shown in FIG. 3.

Fractional Epoch Tick (FET)

Devices repeat their respective hopping sequences in a predictable, periodic fashion. Therefore, in one embodiment, a node that is targeting another node for a packet transmission may calculate the current receive channel of the target node (absent drift) knowing: (1) the time when the target node has started its epoch/hopping sequence relative to the transmitting node, (2) the slot time, and (3) the number of slots per epoch. For example, the slot time information can be exchanged in the link information (LI), which may include, but is not limited to, MAC layer management entity (MLME) parameters, and the number of slots per epoch can be defined by the PHY. In an embodiment, the time when a node has started its epoch can be calculated based on the epoch tick of that node. The term "epoch tick" is used herein to describe where a node is in its hopping sequence at some point in time. For example, the transmitting node may receive the target node's epoch tick upon request, during a discovery period for the network when nodes exchange their timing information with neighbor nodes, or when the target node periodically broadcasts its timing information to other nodes in the network.

The transmitting node may use the epoch tick to determine the target node's epoch start time as follows. When a frame with an epoch tick is transmitted by the target node, the PHY can provide a timing upcall in order to synchronize the epoch tick calculation with a known time in the frame. This known time can be, for example, but not limited to, when the channel ID in the PHY header is sent and when the PHY marks the receive time of a frame. Thus, when the transmitting node receives an epoch tick in a frame, the time when the target node has started its epoch can be calculated as shown in equation (1).

$$\text{Epoch Start Time} = \text{Packet Receive Time} - \text{Epoch Tick} \quad (1)$$

In an embodiment, a fractional epoch tick (FET) may be used instead of the epoch tick. Advantages of using the FET may include, among others, resolution and saving bytes in the various broadcast and other LI frames. That is, rather than sending an epoch tick using some defined number of microseconds per tick, a fraction representing where the node is in its epoch divided by the epoch length can be sent. The fraction can then be scaled by 65,536 and transmitted as the FET. Thus, the FET may be calculated as shown in equation (2).

$$FET = (\text{Epoch Tick} * 65{,}536)/\text{Epoch Length} \quad (2)$$

Having determined the target node's epoch start time using either the epoch tick or FET, the transmitting node may estimate the target node's "current slot" for a given future transmission time (i.e., the current slot describes where the target node will be in its hopping sequence at the future transmission time) based on the epoch start time, the epoch length, and the number of slots per epoch, in accordance with equations (3) and (4), where "mod" represents the modulo operation. Then, given the current slot, the transmitting node may make a slot-to-channel conversion, as described herein, to determine the current receive channel of the target node for the future transmission time.

$$\text{Current Tick in Epoch} = (\text{Transmission Time} - \text{Epoch Start Time}) \bmod (\text{Epoch Length}) \quad (3)$$

$$\text{Current Slot} = \text{Current Tick in Epoch}/\text{Number of Slots in Epoch} \quad (4)$$

Additionally, the transmitting node may perform a targeting procedure, described herein, to ensure that a frame transmitted at the future transmission time will be received by the target node. In one embodiment, the current tick in slot may be calculated in accordance with equation (5), where "mod" represents the modulo operation, to determine whether the target node will receive enough of the transmitted frame in the current slot to sense reception of the frame at the future transmission time. If the target node will not receive enough of the transmitted frame in the current slot to sense reception of the frame at the future transmission time, then the transmitting node may select the next slot in the target node's hopping as a target slot in which to transmit the frame at the future transmission time.

$$\text{Current Tick in Slot} = (\text{Current Tick in Epoch}) \bmod (\text{Slot Time}) \quad (5)$$

Synchronization and Targeting

Figure 4:
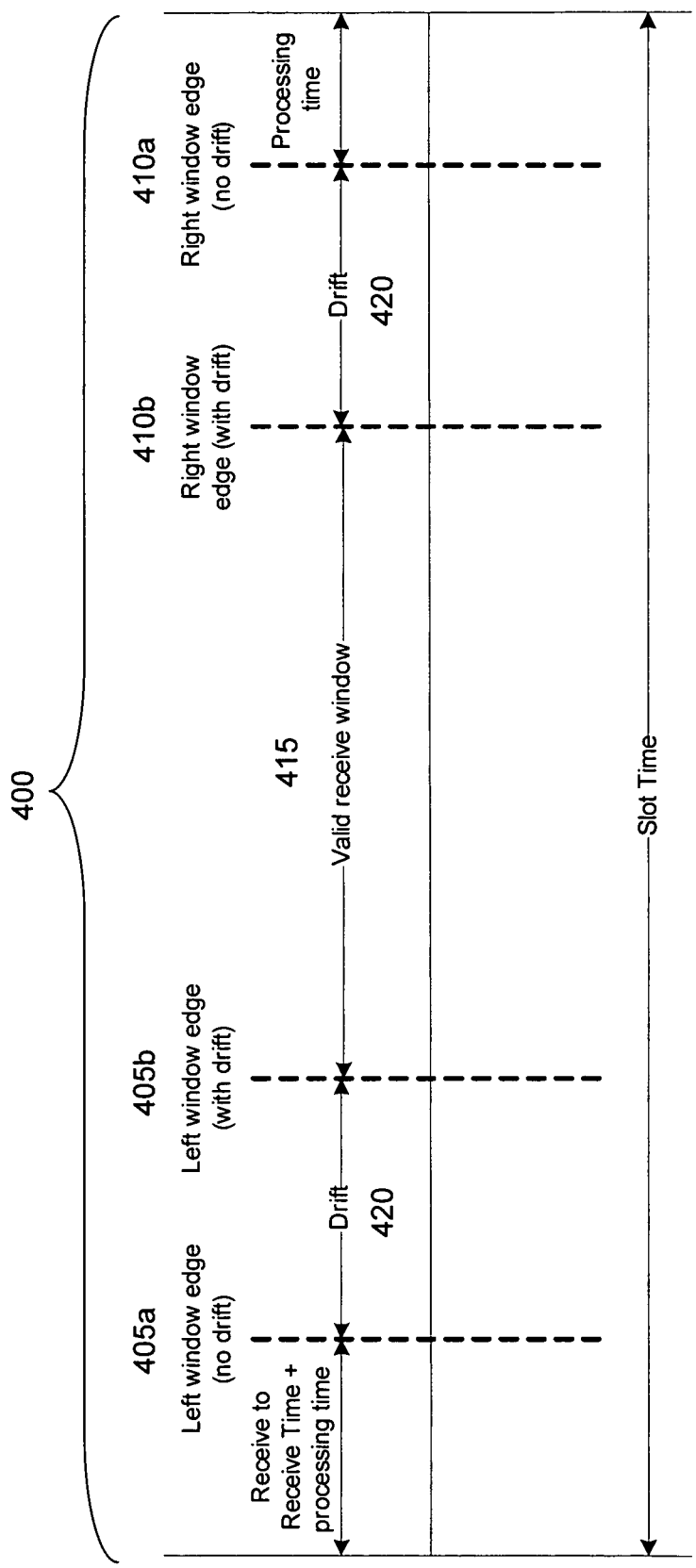
FIG. 4 illustrates an exemplary slot timing diagram.

Once the FET and other link information of the target node have been received, timing updates may be sent in order to keep the timing information recent and to keep the transmitting/receiving nodes fully synchronized. In order to determine when a timing update needs to be sent, the timing within a slot and the clock drift between the nodes need to be known. An exemplary slot timing diagram is illustrated in FIG. 4, which shows a current slot 400. The slot time can be set by the PHY (e.g., 20 milliseconds), as well as the receive time and the processing time (e.g., 1 millisecond and 200 microseconds, respectively). These PHY times may be used to determine what is defined herein, and shown in FIG. 4, as the "left window edge" 405a and the "right window edge" 410a of a valid receive window 415. The valid receive window 415 of the slot 400 may be defined as the time during which the target node is able to receive data or "sense reception" of the frame. Thus, when transmitting a frame to the target node, in accordance with the example of FIG. 4, the first bit of the preamble of the frame must start at or after the left window edge 405a, and the destination address of the frame must be received before the right window edge 410a or else the target node will hop from the current slot 400 to the next slot in its hopping sequence. Note that a target/receiver node will not stay on its home/current slot unless it receives a frame destined to the broadcast MAC address or to its own MAC address. As described herein, in one embodiment, if the transmitting node determines that the target node will not receive enough of the transmitted frame in the current slot to sense reception of the frame at the future transmission time, then the transmitting node may select the next slot in the target node's hopping sequence as a target slot in which to transmit the frame at the future transmission time.

As shown in FIG. 4, the left and right window edges 405a and 410a may "close" (i.e., get closer to each other), as indicated by 405b and 410b, as the "drift" 420 increases. The drift 420 may be calculated by knowing the clock accuracies of the transmitting and receiving nodes. Clock accuracies are typically given in parts per million (ppm) and define the maximum error of the node's clock over time. For example, assume a clock has an accuracy of +/−10 ppm. This means that the time is accurate to within plus or minus 10 microseconds for each second that passes. Thus, if 100 seconds have elapsed, the time will be accurate to within +/−1 millisecond (i.e., the clock will read, worst-case, either 9.999 seconds or 10.001 seconds). In this example, the drift 420 can be calculated by determining how much time has elapsed since the last timing update received, and multiplying that elapsed time by the combined clock accuracies of the transmitter and receiver nodes. For instance, assuming that node A received a timing update from node B at time 0 (relative to node A), node A has a clock accuracy of 5 ppm, node B has a clock accuracy of 10 ppm, and 100 seconds have elapsed, then the total drift can be calculated as 100 seconds*(10 ppm+5 ppm)=1.5 milliseconds.

Hopping Sequence Generation (Slot-to-Channel Conversion)

In one embodiment, in order to save management information exchanged between nodes in a network, hopping sequences for nodes are not exchanged, nor is the entire hopping sequence for a node generated. Instead, a relatively simple calculation can be made to determine the receive frequency of a node at some point in time. This calculation is referred to herein as the "slot-to-channel" conversion. As described herein, a transmitting node may perform a targeting procedure to determine whether to use a receiving node's current slot at a future transmission time or a next slot in the receiving node's hopping sequence as a target slot in which to transmit a frame at the future transmission time. Once the targeting procedure has been performed, the transmitting node knows the target slot of the intended destination node at the desired future time of transmission. This target slot may then be converted to a frequency channel by calculating the "channel index" of the target slot, in accordance with equation (6), where "mod" represents the modulo operation. In an embodiment, the channel index can be used as an index into a global FHSS channel array, which gives a corresponding receive channel for a slot. FIG. 5 illustrates an exemplary global FHSS channel array for hopping sequences having 83 slots per epoch. Persons skilled in the art will understand that the channel array need not be limited to the configuration illustrated in FIG. 5.

$$\text{Channel Index} = ((\text{Slot} * \text{Hop Seed}) + \text{Hop Start}) \bmod (\text{SlotsPerEpoch}) \quad (6)$$

In accordance with equation (6), the channel index may be calculated based on the hop start (also referred to herein as the sequence start) and the hop seed (also referred to herein as the sequence seed) for the target node. For example, the hop start and the hop seed may be determined in accordance with equations (7) and (8), where the SlotsPerEpoch defines the number of channels in the hopping sequence and "mod" represents the modulo operation. Thus, in one embodiment, the values of the hop start and the hop seed can be derived from an identifier of the target node, such as the target node's MAC address, among other identifiers. These start and seed values are fixed for each node in the network. As used herein, the term "MAC[x]" indicates the $x^{th}$ byte of the target node's MAC address, where, in this example, the seventh byte is the last byte in the address. The last three bytes of the MAC address are typically most different between neighboring nodes and, therefore, give the highest probability of having a different hop start and hop seed. The term "xor" indicates a bit-wise exclusive-or operation. Note that the equations (7) and (8) yield values in a range of 1 to (SlotsPerEpoch−1) possible hop seeds and SlotsPerEpoch possible hop starts for a total of (SlotsPerEpoch*(SlotsPerEpoch−1)) different hopping sequences.

$$\text{Hop Start} = (MAC[5] \text{ xor } MAC[6] \text{ xor } MAC[7]) \bmod (\text{SlotsPerEpoch}) \quad (7)$$

$$\text{Hop Seed} = (MAC[7] \bmod(\text{SlotsPerEpoch}-1)) + 1 \quad (8)$$

In an embodiment, the number of slots per epoch (SlotsPerEpoch) or, equivalently, the number of channels in the hopping sequence, is selected to be a prime number, otherwise, the equations (6)-(8) will generate "illegal" hopping sequences (i.e., hopping sequences that do not visit all the channels in an epoch before re-visiting a given channel). In another embodiment, if the number of channels is selected to be a non-prime number, the technique of the hop start and the hop seed described herein may still be applied; however, the total number of valid hop seeds would be limited because, in this case, a seed that is relatively prime to the total number of channels must be selected, resulting in fewer overall unique hopping sequences that can be generated than had a prime number of total channels been selected. Additionally, such approach of selecting a non-prime number of channels requires that the additional relative prime calculation be performed, resulting in more overhead to determine the seed.

Home Channel Receive Procedure

The "home" channel of a node, as referred to herein, indicates the channel that the node should be receiving upon at a given time when it is traversing its frequency hopping sequence. For instance, in an embodiment, if the slot time for a node is defined to be aPhySlotTime, then at each slot boundary (i.e., after every aPhySlotTime passes), the node switches to the next channel in its hopping sequence. The node must be ready to receive on its home channel, that is, sense or "hear" the first bit of the PHY preamble of a transmitted frame by a time defined as aPhyRxToRxTime. While receiving on the home channel, the node is listening for the start of a frame. If the node detects a receive start before the end of the slot, the node stops channel hopping and the MAC/DLL waits until the frame control field is received. If the received frame is a broadcast frame, that is, if a bit indicating that a source address is present (SRC_PRESENT) is the only bit set in the frame control field, then the node receives the rest of the frame until the cyclic redundancy code (CRC) has been validated or until an error occurs in frame reception.

If the received frame has both bits indicating that a source address and a destination address are present (i.e., the SRC_PRESENT and DEST_PRESENT bits are set in the frame control field), then the node receives the destination MAC address and compares it to its own MAC address. If the addresses match, then the node receives the entire frame and, if successful, a communications link (CL) is entered (starting with an acknowledgement procedure) with the polling node. If the destination MAC address does not match the receiving node's own MAC address, then the receiving node discards the frame and resumes receiving on its home channel.

If no source address is present (i.e., the SRC_PRESENT bit is not set in the frame control field) but the destination address is present (i.e., the DEST_PRESENT bit is set in the frame control field) and the destination MAC address matches the receiving node's own MAC address, the node discards the frame. This case represents an error case and should not occur in the network, as only acknowledgement frames should be sent with no source address when sent to unicast destinations.

Frequency Hopping Sequence Process Flow

Figure 6:
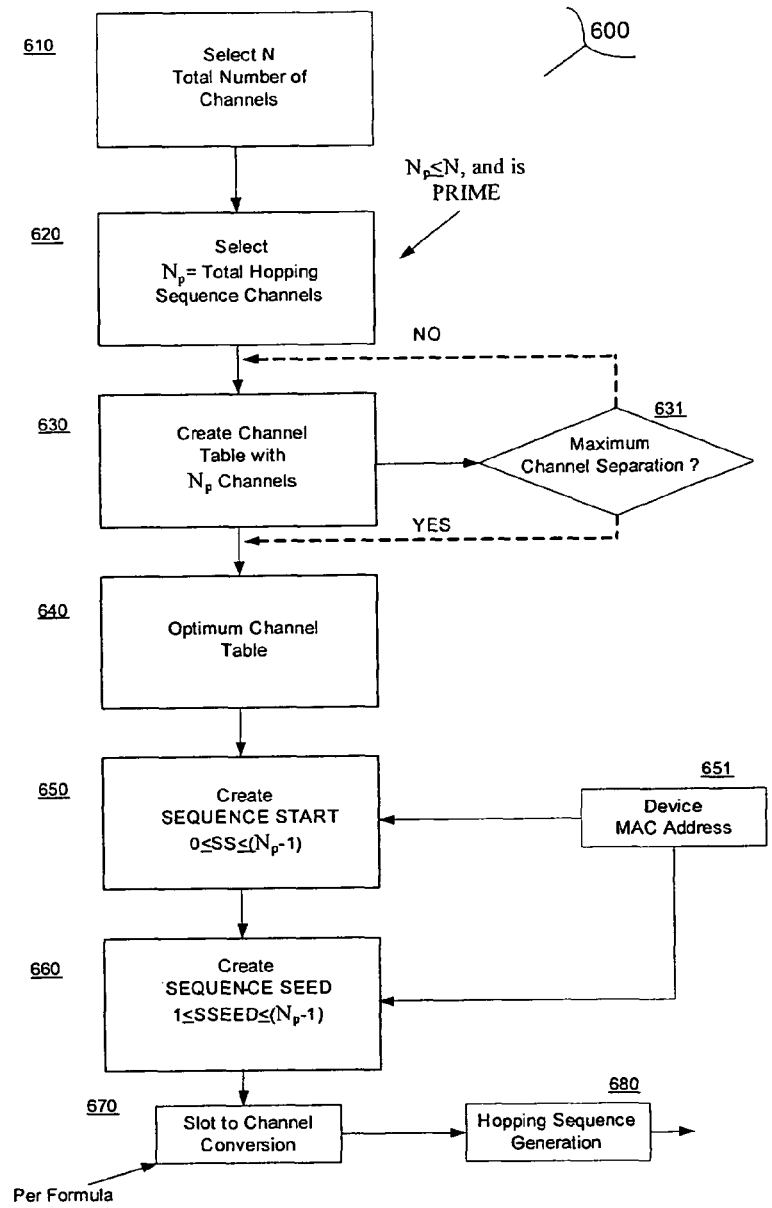
FIG. 6 illustrates an exemplary FHSS hopping sequence creation process flow, in accordance with an embodiment of the present invention.

FIG. 6 illustrates an exemplary hopping sequence creation process flow 600, in accordance with an embodiment of the present invention. Not all of the steps of FIG. 6 have to occur in the order shown, as will be apparent to persons skilled in the art based on the teachings herein, and other similar process flows are also possible within the scope of the invention.

In step 610, a total number of possible channels N for a FHSS network is selected. Then, in step 620, the total number of channels $N_p$ in the hopping sequence is selected. In an embodiment, $N_p$ is the closest prime number to N (without exceeding N). As described herein, by selecting a prime number of channels, periodicity in hop start (sequence start) and hop seed (sequence seed) values can be avoided. In this way, a greater number of unique hopping sequences may be generated because pairing any seed with any start will yield a unique hopping sequence, for a total of $N_p*(N_p-1)$ unique hopping sequences. In an alternate approach, seeds having values that are relatively prime (i.e., having no factors in common) to the total number of channels may be selected, but this approach results in fewer unique hopping sequences being generated because a fewer number of seed values will be available.

In step 630, a channel table for the FHSS network is created that contains $N_p$ channels (e.g., such as the channel table illustrated in FIG. 5). This channel table will be present in all network devices. The channel table is embedded in memory and is not typically distributed "over-the-air." However, there may be exceptions in some embodiments. For example, a gateway node in the network might transmit the channel table to all of the devices in the network during a discovery period. In accordance with steps 631 and 640, in one embodiment, an optimum channel table is created such that its associated hopping sequences have, on average, the maximum channel separation per hop.

In step 650, a sequence start (SS) is created in the range of 0 to ($N_p-1$), inclusive. In accordance with step 651, in one embodiment, the sequence start can be derived from the MAC addresses of the network devices, for example, as reflected in equation (7), to save network overhead. Use of the MAC address in creating the sequence start is particularly convenient because, in order to communicate with each other, the MAC address of any destination device in the network may be known to all of the other devices in the network, typically after each node's discovery process with its neighbor nodes and the gateway. Thus, no additional memory or network bandwidth is required to convey this information between neighbors. Similarly, in step 660, a sequence seed (SSEED) is created in the range of 1 to ($N_p-1$), inclusive. As with the sequence start, in accordance with step 651, the sequence seed can also be derived from the MAC addresses of the network devices, pursuant to equation (8), for example. Persons skilled in the art will understand that other device identifiers may be used in step 651 to create the sequence start and sequence seed. In one embodiment, a unique identifier, such as the device's MAC address, may be used.

In step 670, a slot-to-channel conversion is performed to identify a channel in the hopping sequence of a given network device in accordance with equations (9) and (10), where "mod" represents the modulo operation. That is, a channel index into the channel table is generated and a corresponding channel is selected from the channel table.

$$\text{Channel Index}=((\text{Target Slot}*\text{HopSeed})+\text{HopStart}) \bmod(N_p) \quad (9)$$

$$\text{Channel}=\text{Channel Table [Channel Index]} \quad (10)$$

Thus, in accordance with step 680, a hopping sequence for a given device may be generated using the slot-to-channel conversion. For all slots from 0 to ($N_p-1$) in the device's hopping sequence, the channel for a given slot is calculated using the channel index in accordance with equations (9) and (10). This hopping sequence repeats itself periodically (every $N_p$ channels).

In this way, the example embodiment illustrated in FIG. 6 provides the slot-to-channel conversion for the device, and the transmitting and destination devices are now able to communicate synchronously without wasting network overhead, as is common with other FHSS systems.

In one embodiment, the steps 610-640 of FIG. 6 may be performed once, on a global basis, for the entire network. In another embodiment, when one device in the network has data to transmit to another device in the network, the transmitting device may perform the steps 650-680 of FIG. 6 to identify a channel of the target device's hopping sequence on which to transmit the data at a given time. Also, each device in the network may create its own hopping sequence in accordance with steps 650-680 of FIG. 6. In an embodiment, the device's hopping sequence information is available to all other devices in the network because they are aware of the MAC addresses, or other device identifiers, of neighbor devices that communicate with them, and all devices in the network have the same fixed channel table embedded in memory. That is, using a target device's MAC address, for example, a transmit device may perform a slot-to-channel conversion in accordance with the fixed channel table and send packets to the target node following the hopping sequence that the target node will be using at a given transmission time.

Figure 7:
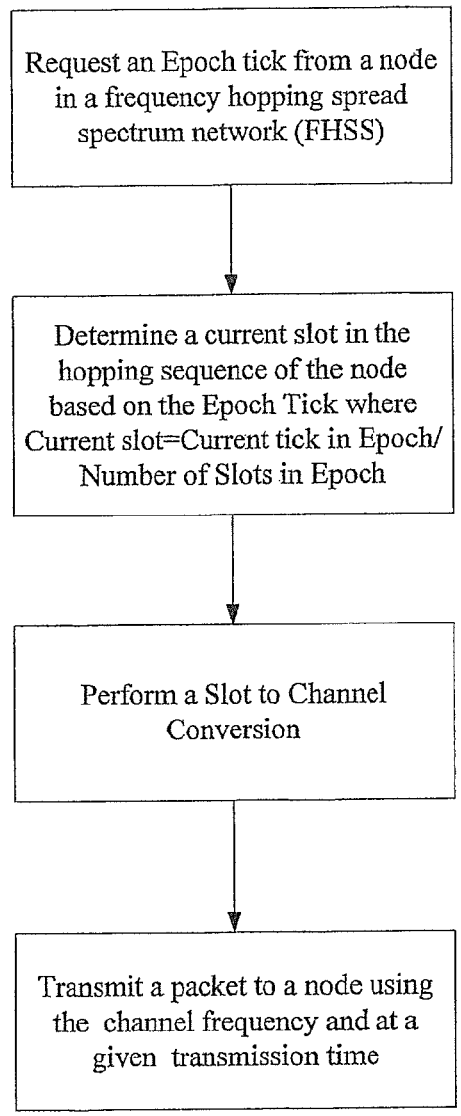
FIG. 7 illustrates an exemplary process flow of determining a channel in a hopping sequence in a frequency-hopping spread spectrum (FHSS) network.

FIG. 7 illustrates an exemplary process flow 700 of determining a channel in a hopping sequence in a node of a frequency hopping spread spectrum (FHSS) network.

In step 710, a current slot of the node in the hopping sequence is determined for a given time based on a number of slots per epoch (slots per Epoch) for the network. The Slots per Epoch can be a prime number. Each slot in the epoch has an associated channel frequency. The slots is determined based on an epoch tick recieved from the node. In responde to a request for the epoch tick. The request occuring during a discovery period when nodes in the network exchange their respective timing information with neighbor nodes or when the node periodically broadcasts its timing information. The epoch tick establishes where the node is in its hopping sequence.

In step 720, the current slot of the node is converted to its associated channel frequency using an identifier of the node to generate a channel index into a network channel table.

In step 730, a packet is transmitted to the node on the associated channel frequency at a given transmisson time.

The present invention has been described with reference to exemplary embodiments. However, it will be apparent to those skilled in the art that it is possible to embody the invention in specific forms other than those described above without departing from the spirit of the invention. Accordingly, the various embodiments described herein are illustrative, and they should not be considered restrictive in any way. The scope of the invention is given by the appended claims, rather than the preceding description, and all variations and equivalents thereof that fall within the range of the claims are intended to be embraced therein.

What is claimed is:

1. A method for generating unique hopping sequences for nodes in a frequency-hopping spread spectrum (FHSS) network, comprising:
    selecting a total number of hopping sequence channels;
    creating a channel table for the network having the total number of hopping sequence channels;
    generating, for a given node, a sequence start and a sequence seed based on a node identifier; and
    receiving an epoch tick from the given node that establishes where the given node is in its hopping sequence, wherein the epoch tick is received during a discovery period when nodes in the network exchange their respective timing information with neighbor nodes, or when the given node periodically broadcasts its timing information;
    performing a slot-to-channel conversion for each of a plurality of time slots to identify a channel in the hopping sequence of the given node by generating a channel index into the channel table based on the sequence start and the sequence seed for the given node and a current slot of the given node determined using the epoch tick, and retrieving the channel from the channel table that corresponds to the channel index.

2. The method of claim 1, comprising:
    determining the total number of channels based on a total number of possible channels for the network, wherein the total number of channels is a prime number which is closest to but does not exceed the total number of possible channels for the network.

3. The method of claim 1, wherein the step of creating the channel table comprises: creating the channel table such that its associated hopping sequences have on average a maximum channel separation per hop.

4. The method of claim 1, wherein the channel table is embedded in node memory.

5. The method of claim 1, wherein the node identifier includes a unique node identifier.

6. The method of claim 5, wherein the unique node identifier includes a media access control (MAC) address of the given node.

7. A method for determining a channel in a hopping sequence of a node in a frequency-hopping spread spectrum (FHSS) network, comprising:
    determining the node's current slot in the hopping sequence for a given transmission time based on a number of slots per epoch for the network, wherein the number of slots per epoch comprises a prime number and each slot in the epoch has an associated channel frequency;
    converting the current slot to its associated channel frequency by using an identifier of the node to generate a channel index into a network channel table; and transmitting a packet to the node on the associated channel frequency at the given transmission time,
    wherein the step of determining the current slot comprises receiving an epoch tick from the node that establishes where the node is in its hopping sequence, the epoch tick being received in response to a request for the epoch tick, during a discovery period when nodes in the network exchange their respective timing information with neighbor nodes, or when the node periodically broadcasts its timing information.

8. The method of claim 7, wherein the step of determining the current slot comprises:
    calculating an epoch start time based on the epoch tick, and receive time of a frame in which the epoch tick was sent;
    calculating a current tick in the epoch based on the given transmission time, the calculated epoch start time, and an epoch length, wherein the node dwells on each of the associated frequency channels in its hopping sequence for a slot length, and the epoch length equals the slot length times the number of slots per epoch; and
    determining the current slot based on the calculated current tick in the epoch and based on the number of slots per epoch.

9. The method of claim 8, wherein the epoch tick comprises a fractional epoch tick (FET) that represents the epoch tick as a fraction of the epoch length.

10. The method of claim 8, wherein the step of determining the current slot comprises:
    calculating a current tick in the current slot based on the calculated current tick in the epoch and based on the slot length.

11. The method of claim 10, further comprising:
determining, based on the calculated current tick in the slot, whether the node will receive enough of the transmitted packet in the current slot to sense reception of the transmitted packet.

12. The method of claim 11, wherein a next slot in the node's hopping sequence is selected as the current slot when it is determined that the node will not receive enough of the transmitted packet in the current slot to sense reception of the transmitted packet.

13. The method of claim 7, wherein the step of converting the current slot comprises: determining a hopping sequence start and a hopping sequence seed for the node based on the node identifier and generating the channel index based on the hopping sequence start and the hopping sequence seed.

14. The method of claim 13, wherein the node identifier includes a media access control (MAC) address.

15. The method of claim 7, wherein each node in the network traverses the associated frequency channels in its respective hopping sequence in a pseudo-random manner with respect to other nodes in the network.

16. The method of claim 15, wherein the node stops traversing the associated frequency channels in its hopping sequence when receiving the transmitted packet.

17. The method of claim 16, wherein, following reception of the transmitted packet, the node resumes traversing its hopping sequence on the associated frequency channel to which the node would have traversed had the node not stopped traversing the associated frequency channels in its hopping sequence when receiving the transmitted packet.

18. A frequency-hopping spread spectrum (FHSS) network, comprising:
a first node having a hopping sequence; and
a second node having a packet to transmit to the first node, wherein the second node receives an epoch tick from the first node in response to a request during a discovery period when nodes in the network exchange their respective timing information with neighbor nodes, or when the first node periodically broadcasts its timing information, the second node generates a sequence start and a sequence seed based on an identifier of the first node, performs a slot-to-channel conversion to identify a channel in the hopping sequence of the first node based on a current slot of the first node determined using the epoch tick, and transmits the packet to the first node on the identified channel,
wherein the epoch tick establishes where the first node is in its hopping sequence.

19. The network of claim 18, wherein the first node and the second node each has embedded in memory a network channel table having a total number of hopping sequence channels.

20. The network of claim 19, wherein the total number of hopping sequence channels is a prime number which is closest to but does not exceed a total number of possible channels for the network.

21. The network of claim 19, wherein, in performing the slot-to-channel conversion, the second node generates a channel index into the channel table based on the sequence start and the sequence seed for the first node and retrieves the identified channel from the channel table that corresponds to the generated channel index.

22. The network of claim 19, wherein the hopping sequences associated with the channel table have on average a maximum channel separation per hop.

23. The network of claim 19, wherein the identifier of the first node includes a unique node identifier.

24. The network of claim 23, wherein the unique identifier of the first node includes a media access control (MAC) address of the first node.

25. A frequency-hopping spread spectrum (FHSS) network, comprising:
a first node having a hopping sequence with a number of slots per epoch, wherein the number of slots per epoch comprises a prime number and each slot in the epoch has an associated channel frequency; and
a second node having a packet to transmit to the first node at a given transmission time, wherein the second node determines the first node's current slot in the hopping sequence for the given transmission time based on the number of slots per epoch, converts the current slot to its associated channel frequency by using an identifier of the first node to generate a channel index into a network channel table, and transmits the packet to the first node on the associated channel frequency at the given transmission time,
wherein the first node transmits to the second node an epoch tick that establishes where the first node is in its hopping sequence, the second node receiving the epoch tick in response to a request for the epoch tick, during a discovery period when nodes in the network exchange their respective timing information with neighbor nodes, or when the first node periodically broadcasts its timing information.

26. The network of claim 25, wherein the second node calculates an epoch start time based on the epoch tick, and the receive time of a frame in which the epoch tick was sent; calculates a current tick in the epoch based on the given transmission time, the calculated epoch start time, and an epoch length; and determines the current slot based on the calculated current tick in the epoch and based on the number of slots per epoch, and
wherein the first node dwells on each of the associated frequency channels in its hopping sequence for a slot length, and the epoch length comprises the slot length times the number of slots per epoch.

27. The network of claim 26, wherein the epoch tick includes a fractional epoch tick (FET) that represents the epoch tick as a fraction of the epoch length.

28. The network of claim 26, wherein the second node calculates a current tick in the current slot based on the calculated current tick in the epoch and based on the slot length.

29. The network of claim 28, wherein the second node determines, based on the calculated current tick in the current slot, whether the first node will receive enough of the transmitted packet in the current slot to sense reception of the transmitted packet.

30. The network of claim 29, wherein the second node selects a next slot in the first node's hopping sequence as the current slot when the second node determines that the first node will not receive enough of the transmitted packet in the current slot to sense reception of the transmitted packet.

31. The network of claim 25, wherein the second node generates the channel index based on a hopping sequence start and a hopping sequence seed, which are determined based on the identifier of the first node.

32. The network of claim 31, wherein the identifier includes a media access control (MAC) address.

33. The network of claim 25, wherein each node in the network traverses the associated frequency channels in its respective hopping sequence in a pseudo-random manner with respect to other nodes in the network.

34. The network of claim 33, wherein the first node stops traversing the associated frequency channels in its hopping sequence when receiving the transmitted packet at the given transmission time.

35. The network of claim 34, wherein, following reception of the transmitted packet, the first node resumes traversing its hopping sequence on the associated frequency channel to which the first node would have traversed had the first node not stopped traversing the associated frequency channels in its hopping sequence when receiving the transmitted packet.

* * * * *